United States Patent
Larson et al.

(10) Patent No.: US 6,756,459 B2
(45) Date of Patent: Jun. 29, 2004

(54) BINDER COMPOSITIONS FOR DIRECT-TO-METAL COATINGS

(75) Inventors: Gary Robert Larson, Hatfield, PA (US); Leo Joseph Procopio, Lansdale, PA (US); William Joseph Rosano, Hatboro, PA (US); Otto C. Ziemann, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 99 days.

(21) Appl. No.: 09/950,968

(22) Filed: Sep. 12, 2001

(65) Prior Publication Data

US 2002/0058749 A1 May 16, 2002

Related U.S. Application Data

(60) Provisional application No. 60/236,371, filed on Sep. 28, 2000.

(51) Int. Cl.$^7$ .................. C09D 143/02; C09D 5/02; C09D 125/08; C09D 125/12; C09D 125/14
(52) U.S. Cl. .................. 526/274; 524/547; 524/565; 524/806; 524/807; 524/818; 524/831; 524/832; 526/279; 526/287; 526/316; 526/317.1; 526/342
(58) Field of Search ............... 524/818, 565, 524/547, 806, 831, 807, 832; 526/279, 316, 342, 274, 287, 317.1

(56) References Cited

U.S. PATENT DOCUMENTS

| | | | |
|---|---|---|---|
| 3,449,303 A | 6/1969 | Caldwell et al. | 260/80.71 |
| 4,421,889 A * | 12/1983 | Braun et al. | 524/381 |
| 4,506,057 A | 3/1985 | Greene et al. | 524/461 |
| 5,191,029 A * | 3/1993 | DelDonno | 525/366 |
| 5,380,784 A * | 1/1995 | Usuki et al. | 524/407 |
| 5,385,960 A | 1/1995 | Emmons et al. | 523/205 |
| 5,412,019 A | 5/1995 | Roulstone et al. | 524/497 |
| 5,663,224 A | 9/1997 | Emmons et al. | 524/188 |
| 5,804,650 A * | 9/1998 | Tsuda et al. | 524/805 |
| 6,306,460 B1 * | 10/2001 | Reck et al. | 427/256 |

FOREIGN PATENT DOCUMENTS

| | | | |
|---|---|---|---|
| AU | 592834 | 5/1987 | C03F/246/00 |
| DE | 19514266 A1 | 10/1996 | C04B/41/63 |
| EP | 0221498 A2 | 5/1987 | C08F/246/00 |
| EP | 0221498 | 5/1987 | C08F/246/00 |
| EP | 221498 A * | 5/1987 | C08F/2/22 |
| EP | 05016666 A1 | 9/1992 | C08F/246/00 |
| EP | 0779335 A1 | 6/1997 | C08L/27/16 |
| GB | 958856 | 5/1964 | |
| GB | 1541909 | 3/1979 | C08L/31/02 |
| WO | WO99/25780 | 5/1999 | C09D/17/00 |

* cited by examiner

Primary Examiner—Kelechi C. Egwim
(74) Attorney, Agent, or Firm—Karl Stauss

(57) ABSTRACT

A binder composition for aqueous coatings that exhibit high gloss and superior corrosion resistance when applied to metal substrates comprising an aqueous emulsion copolymer, the copolymer including as polymerized units, at least one ethylenically unsaturated monomer and an ethylenically unsaturated strong acid monomer, such as phosphorus containing monomers, particularly phosphoethylmethacrylate; or salts thereof. Also provided is a method for achieving high gloss and superior corrosion resistance of metal substrates by coating a substrate with an aqueous coating composition comprising the binders of the present invention and drying, or allowing to dry, the aqueous composition.

5 Claims, No Drawings

BINDER COMPOSITIONS FOR DIRECT-TO-METAL COATINGS

CROSS REFERENCE TO RELATED PATENT APPLICATIONS

This is a non-provisional application of prior pending U.S. provisional application serial number 60/236,371 filed Sep. 28, 2000.

This invention relates to binder compositions in aqueous coatings that exhibit high gloss and superior corrosion resistance when applied to metal substrates and a method for achieving high gloss and superior corrosion resistance of metal substrates by coating a substrate with said compositions. More particularly this invention relates to binder compositions in aqueous coatings that exhibit high gloss and superior corrosion resistance when applied to metal substrates comprising an aqueous emulsion copolymer, the copolymer including as polymerized units, at least one ethylenically unsaturated monomer and an ethylenically unsaturated strong acid monomer, or salts thereof. Preferred strong acid monomers or salts thereof of the present invention are phosphorus containing monomers, particularly phosphoethylmethacrylate ("PEM").

U.K. Patent No. 958,856, published May 27, 1964, discloses copolymers derived from (1) one or more esters of acrylic and/or methacrylic acid; (2) a methylol compound and/or an alkyl ether thereof of acrylic and/or methacrylic acid amide; and (3) a mixed ester of a diol esterified with acrylic or methacrylic acid and with a di or polybasic organic or inorganic acid having a pKa value of less than 4. Such copolymers include PEM and are adhesive, resistant to water, washing and solvents and are hardened at low ambient temperatures. However, specific copolymer formulations, including copolymers made from styrene based monomers, are not disclosed.

U.S. Pat. No. 3,449,303 discloses phosphate ester polymers for improved adhesion of dyes in textile fibers, yarns and fabrics such as allyloxy and allyloxyalkoxy phosphates and homologs thereof, including PEM, and methods of producing such polymers. However, the use of the polymers in binder compositions for aqueous coatings is not disclosed, including in combination with at least one ethylenically unsaturated monomer.

U.S. Pat. No. 4,506,057 discloses a phosphorus modified latex composition useful in the coating of substrates with inorganic fillers. Disclosed is a latex particle having phosphorus groups intimately bound to the particle's surface formed by the emulsion polymerization of a latex with a phosphorus compound. However, specific quantitative and optimized combinations of at least one ethylenically unsaturated monomer and an ethylenically unsaturated strong acid monomer, or salts thereof, are not disclosed and no mention of achieving certain levels of corrosion resistance and high gloss is disclosed.

European Patent Application No. 86114977, published as EP 0 221 498, discloses anti-corrosive random copolymers, anti-corrosive random emulsion co-polymers, methods of inhibiting corrosion on a corrosion-susceptible substrate and methods of preparing random emulsion copolymers. In particular, a polymerizable surface active alkylphosphate monomer is reacted with an ethylenically unsaturated monomer resulting in an anti-corrosive copolymer. However, specific quantitative and optimized combinations of at least one ethylenically unsaturated monomer and an ethylenically unsaturated strong acid monomer, or salts thereof, are not disclosed and no mention of achieving high gloss is disclosed.

PCT Patent Application No. PCT/EP98/07284, published as WO 99/25780, discloses pigment-containing preparations, which contain as the binder at least one aqueous polymer dispersion, the polymer of which is functionalized with phosphonate groups. However, specific quantitative and optimized combinations of at least one ethylenically unsaturated monomer and an ethylenically unsaturated strong acid monomer, or salts thereof, are not disclosed.

The problem faced by the inventors is to optimize the levels of ethylenically unsaturated monomers and an ethylenically unsaturated strong acid monomer, or salts thereof, needed in binder compositions for aqueous coatings, in order to achieve high gloss and superior corrosion resistance when applied to metal substrates, without sacrificing properties expected of commercial aqueous coatings. Quite unexpectedly, the inventors discovered critical and optimum levels and ratios of such monomers in order to achieve high gloss and superior corrosion resistance when applied to metal substrates, without sacrificing properties expected of commercial aqueous coatings.

In one aspect of the present invention there is provided a binder composition for aqueous coatings that exhibit high gloss and superior corrosion resistance when applied to metal substrates comprising an aqueous emulsion copolymer, the copolymer including as polymerized units, at least one ethylenically unsaturated monomer and an ethylenically unsaturated strong acid monomer, or salts thereof. Preferred strong acid monomers or salts thereof of the present invention are phosphorus containing monomers, particularly phosphoethylmethacrylate ("PEM").

In another aspect of the present invention there is provided a binder composition for aqueous coatings that exhibit high gloss and superior corrosion resistance when applied to metal substrates comprising an aqueous emulsion copolymer, the copolymer including as polymerized units, at least one ethylenically unsaturated monomer, an ethylenically unsaturated strong acid monomer and an additional ethylenically unsaturated acid monomer, or salts thereof, whereby the total acid level is less than about six percent (6%) by weight whereby the strong acid monomer is greater than about 45% of the total acid but not exceeding about 3.7% by weight of the copolymer binder composition. Preferably, the total acid level of the copolymer binder composition should be less than about six percent (6%) by weight whereby the strong acid monomer is greater than about 65% of the total acid but not exceeding about 3.7% by weight of the copolymer binder composition.

In another aspect of the present invention there is provided a method for achieving high gloss and superior corrosion resistance of metal substrates by coating a substrate with the compositions of the present invention and drying, or allowing to dry, the aqueous composition.

The aqueous emulsion copolymer includes at least one copolymerized ethylenically unsaturated monomer. The ethylenically unsaturated monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; silane functional monomers, including methacryloxy-propyltrimethoxy silane(MATS); monomers bearing acetoacetate-functional groups; styrene and substituted styrenes; butadiene;

ethylene, propylene, α-olefins such as 1-decene; vinyl acetate, vinyl butyrate and other vinyl esters; and vinyl monomers such as vinyl chloride, vinylidene chloride. Preferred are all-acrylic, predominantly acrylic, styrene/acrylic, and vinyl acetate/acrylic copolymers.

The emulsion copolymer contains 0.1–3.7%, by weight based on the dry weight of the copolymer, copolymerized ethylenically unsaturated strong acid monomer, or salts thereof. "Ethylenically unsaturated strong acid monomer" means a monomer bearing a pendant acid group having a pKa (in water at 20 degree C.) less than 4, or a salt thereof. Strong acid monomers include, without limitation, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, vinyl phosphonic acid, phosphoalkyl (meth) acrylates such as phosphoethyl (meth)acrylate ("PEM"), phosphopropyl (meth)acrylate, and phosphobutyl (meth) acrylate, phosphoalkyl crotonates, phosphoalkyl maleates, phosphoalkyl fumarates, phosphodialkyl (meth)acrylates, phosphodialkyl crotonates, and allyl phosphate. Preferred are phosphorous-containing strong acid monomers. It is also contemplated that the copolymerized ethylenically unsaturated strong acid monomer may be formed after the polymerization of at least one ethylenically unsaturated monomer and a strong acid precursor monomer by effecting the reaction of the copolymerized strong acid precursor monomer so as to convert it to a copolymerized strong acid monomer; for example a polymer containing, as a polymerized unit, hydroxyethyl methacrylate which may then be reacted, as is well known in the art, to form, for example, sulfoethyl methacrylate or phosphoethyl methacrylate.

The emulsion copolymer may contain about 0–3.3%, by weight based on the dry weight of the copolymer, copolymerized ethylenically unsaturated weak acid functional monomer, higher monoacidic oligomers thereof, or salts thereof. "Ethylenically unsaturated weak acid functional monomer" means an acid monomer that is not a strong acid monomer as defined above. Such weak acid functional monomers include, without limitation, C3–C6 monoethylenically unsaturated monocarboxylic acids and the alkali metal and ammonium salts thereof, such as for example, acrylic acid, methacrylic acid, crotonic acid, vinylacetic acid and acryloxypropionic acid; C4–C8 monoethylenically unsaturated dicarboxylic acids and the alkali metal and ammonium salts thereof, and the anhydrides of the cis-dicarboxylic acids such as for example itaconic acid, fumaric acid, maleic acid, monomethyl itaconate, monomethyl fumarate, monobutyl fumarate, maleic anhydride; as well as many other examples of non-phosporous acid functional monomers, including ethacrylic acid, α-chloroacrylic acid, α-vinylacrylic acid, α-phenylacrylic acid, cinnamic acid, chlorocinnamic acid and β-styrylacrylic acid. Preferred is 0–1% copolymerized ethylenically unsaturated carboxylic acid monomer.

The emulsion copolymer may contain copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

The glass transition temperature ("Tg") of the emulsion copolymer is from −20° C. to 60° C. "Glass transition temperature" or "$T_g$" as used herein, means the temperature at or above which a glassy polymer will undergo segmental motion of the polymer chain. Glass transition temperatures of a polymer can be estimated by the Fox equation [Bulletin of the American Physical Society 1, 3, page 123 (1956)] as follows:

$$\frac{1}{T_g} = \frac{w_1}{T_{g(1)}} + \frac{w_2}{T_{g(2)}}$$

For a copolymer of monomers $M_1$ and $M_2$, $w_1$ and $w_2$ refer to the weight fraction of the two co-monomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer can also be measured by various techniques including, for examples, differential scanning calorimetry ("DSC"). The particular values of $T_g$ reported herein are calculated based on the Fox equation.

The glass transition temperatures of homopolymers may be found, for example, in "Polymer Handbook", edited by J. Brandrup and E. H. Immergut, Interscience Publishers.

The polymerization techniques used to prepare aqueous emulsion-copolymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 30 °C. and 95° C., more preferably between 50° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the emulsion polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage. The use of chain transfer agent in the amount of 0 to 5 wt %, based on the total weight of monomer used to form the aqueous emulsion copolymer is effective to provide a GPC weight average molecular weight of 1000 to 5,000,000. Preferred is the use of 0 to 1 wt % chain transfer agent, based on the total weight of monomer used to form the aqueous emulsion copolymer.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometric patterns such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of strong acid monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. A preferred multistage emulsion polymer contains strong acid monomer in only one of the stages.

The average particle diameter of the emulsion copolymer particles is preferred to be from 30 nanometers to 500 nanometers, as measured by a BI-90 Particle Sizer. More preferable is an average particle diameter in the range of 50–250 nanometers.

In an alternative embodiment of this invention the aqueous coating composition containing the binder for direct-to-metal applications, is contemplated to include pigments and/or fillers such as, for example, titanium dioxide, iron oxide, zinc oxide, magnesium silicate, calcium carbonate, organic and inorganic colored pigments, anti-corrosive pigments, and clay. Such pigmented coating compositions have a pigment volume concentration (PVC) in the range of 0 to 70%, more preferably from 0 to 30%.

The aqueous coating composition of this invention containing the binder for direct-to-metal applications is contemplated to encompass coating or paint compositions which may be described in the art as clear coatings, flat coatings, satin coatings, semi-gloss coatings, gloss coatings, primers, textured coatings, and the like. It is also contemplated that the aqueous coating composition of this invention may be used as the later-applied coating described herein, i.e., that the same or a different coating may be used as a topcoat as well as being applied directly over the substrate. The aqueous coating composition is prepared by techniques which are well known in the coatings art. First, optionally, at least one pigment is well dispersed in an aqueous medium under high shear such as is afforded by a COWLES mixer or, in an alternative, at least one pre-dispersed pigment may be used. Then the aqueous emulsion copolymer is added under low shear stirring along with other coatings adjuvants as desired. Alternatively, the aqueous emulsion copolymer may be included in the optional pigment dispersion step. The aqueous composition may contain conventional coatings adjuvants such as, for example, tackifiers, emulsifiers, coalescing agents, buffers, neutralizers, thickeners or rheology modifiers, humectants, wetting agents, biocides, plasticizers, antifoaming agents, colorants, waxes, and anti-oxidants. The aqueous coating composition may comprise a blend of polymers in combination with the aqueous emulsion copolymer of the present invention. Such additional polymers preferably do not contain strong acid monomer as a copolymerized unit. Such additional polymers may be present at a level of 0–400%, by weight based on the weight of the aqueous emulsion copolymer.

The solids content of the aqueous coating composition may be from about 10% to about 70% by volume. The viscosity of the aqueous composition may be from 0.05 to 10 Pa.s (50 cps to 10,000 cps), as measured using a Brookfield viscometer; although the appropriate viscosity for different application methods vary considerably.

The aqueous composition may applied by conventional application methods such as, for example, brushing and spraying methods such as, for example, roll coating, doctor-blade application, printing methods, air-atomized spray, air-assisted spray, airless spray, high volume low pressure spray, and air-assisted airless spray.

In the method of this invention the aqueous coating composition is applied to a substrate such as, for example, metal, primed surfaces and previously painted surfaces. The aqueous coating composition on the substrate is typically dried, or allowed to dry, at a temperature from 10° C. to 95° C.

The following examples are presented to illustrate the invention and the results obtained by the test procedures and are not meant to limit the scope of the present invention.

Abbreviations
AA=acrylic acid
o-AA=oligomeric acrylic acid
AAEM=2-(acetoacetoxy)ethyl methacrylate
ALMA=allyl methacrylate
AN=acrylonitrile
APS=ammonium persulfate
BA=butyl acrylate
BGDMA=1,3-butylene glycol dimethacrylate
BMA=butyl methacrylate
DI water=deionized water
nDDM=n-dodecyl mercaptan
DVB=divinyl benzene
EHA=2-ethylhexyl acrylate
HEMA=2-hydroxyethyl methacrylate
MATS=methacryloxypropyltrimethoxysilane
MMA=methyl methacrylate
PEM=phosphoethyl methacrylate
STY=styrene In the description of the compositions, a single slash ("/") implies a copolymer, numbers separated by a single slash within parentheses indicates the copolymer weight ratio of the particular stage, while a double slash ("//") implies a separate stage. Numbers refer to parts by weight and do not necessarily sum to 100.

EXAMPLE 1

Preparation of Aqueous Coating Composition

This example shows how to prepare the aqueous coating compositions used to evaluate properties. Aqueous binders of the present invention were incorporated in aqueous coating compositions for evaluation. The aqueous coating compositions were prepared according to standard paint formulation techniques known by one skilled in the art and according to the formulation described herein. Grind: All liquid ingredients were placed in a vessel except for the ammonia. The vessel was placed on a bench-top stirrer and the ammonia was then added to neutralize the solution. Table 1.1 below shows the formulation details. The contents were mixed in a COWLES mixer. Letdown: During the letdown phase, the Grind was added to the polymer and water prior to addition of the Texanol and other components. Ammonium hydroxide was added to maintain the pH level.

TABLE 1.1

Formulation ingredients used in aqueous coating composition
Gloss Direct-to-Metal Paint Coating Formulation

| Material | Pounds | Gallons |
|---|---|---|
| GRIND | | |
| Water | 40.00 | 4.80 |
| Arcosolv DPM | 20.00 | 2.53 |
| Tamol 681 | 9.00 | 0.99 |
| Drewplus L-493 | 1.00 | 0.14 |
| Triton CF-10 | 2.00 | 0.23 |
| Ammonium Hydroxide (28%) | 1.00 | 0.13 |
| Ti-Pure R-706 | 205.00 | 6.15 |
| Grind on High Speed Disperser then let-down with: | | |
| LET DOWN | | |
| Polymer | 569.5 | 66.35 |
| Water | 94.00 | 11.16 |
| Texanol | 37.50 | 4.75 |
| Sodium Nitrite (15%) | 9.00 | 1.08 |
| Ammonium Hydroxide (14%) | 9.00 | 1.25 |
| Acrysol RM-8W | 3.00 | 0.46 |
| TOTALS | 1000.00 | 99.89 |
| Paint Properties | | |
| PVC: | 18.0 | |
| Volume Solids: | 35.1 | |
| Weight Solids: | 46.3 | |
| Lbs./Gal: | 10.0 | |
| Stormer Viscosity: | 85–100 KU | |
| pH: | 9.0–9.5 | |

Polymer = binder composition of the present invention, shown in later examples
Tamol 681 = pigment dispersant
Triton CF-10 = surfactant/wetting agent
Drewplus L-493 = defoamer
R-706 = titanium dioxide
Arcosolv DPM, Texanol = coalescents
Sodium nitrite = flash rust additive ACRYSOL and TAMOL are trademarks of Rohm and Haas Company; ARCOSOLV is a trademark of Arco Chemical Company; TEXANOL is a trademark of Eastman Chemical Co.; TI-PURE is a trademark of E. I. DuPont DeNemours Co.; DREWPLUS is a trademark of Drew Industrial Div., Ashland Chemical Ind; and TRITON is a trademark of Union Carbide.

EXAMPLE 2

Preparation of Aqueous Copolymer Compositions

This example shows the general procedure used to prepare the aqueous binder copolymer compositions of the present invention. A specific formulation is used for illustration purposes. It is to be understood that one skilled in the art may vary the particular ingredients to obtain formula variations, some of which are shown in Example 3 below. Such compositions were incorporated into the formulation described in Example 1 and then evaluated as described in further examples.

Preparation for 70.04 STY/25.61 EHA/0.5 MMA/2.85 PEM Tg=46° C.

A monomer emulsion (ME) was prepared using 409 g of DI water, 47.2 g of 30 weight percent active ingredient ethoxylated C6 to C18 alkyl ether sulfate having 1 to 40 ethylene oxide groups per molecule, 446.3 g ethylhexyl acrylate (EHA), 1237.9 g styrene (STY), 49.6 g of phosphoethyl methacrylate [PEM], and 8.8 g of methyl methacrylate (MMA). The container used to weigh the monomers was rinsed with 44.3 g DI water. A five-liter, 4-neck round bottom flask containing an initial charge of 1145.1 g DI water and 4.72 g of 30 weight percent active ingredient sodium laureth sulfate with an ethylene oxide level of 1 to 4 followed by a rinse of 18.4 g of DI water, was heated to 90° C. under nitrogen sweep. An aliquot of ME (117.4 g) was added to the flask followed by the addition of 4.3g APS dissolved in 44.3 g DI water and a rinse of 4.4 g of DI water. After stirring for 15 minutes, the remaining ME and a solution of 2.9 g of APS in 102.2 g of DI water were added linearly and separately to the reaction flask over 1.5 to 4 hours. The temperature of the batch in the kettle was maintained at 89° C. during the addition. When all additions were complete, the containers were rinsed with 48.7 g of DI water which was added to the reaction flask. A catalyst/activator pair was added after the monomer emulsion feed was completed. The polymer was neutralized with aqueous ammonia (29%).

Preparation of a two stage polymer sample, as depicted in Sample 35 of Example 3, is described below. This two stage polymer comprises: 75% Stage 1 (29.82 STY/44.92 EHA/19.5AN/2.92 MMA/2.85 PEM)//25% Stage 2 (10.1 STY/3 MAA/86.92 BMA).

A monomer emulsion (ME) was prepared using 412.5 g of DI water, 18.7 g of 25 weight percent active ingredient ammonium PEG 300 tridecyl ether phosphate surfactant, 4.3 g of 30 weight percent active ethoxylated C6 to C18 alkyl ether sulfate having 1 to 40 ethylene oxide groups per molecule, 583.2 g ethylhexyl acrylate (EHA), 253.1 g of acrylonitrile (AN), 387.2 g styrene (STY), 37.0 g of phosphoethyl methacrylate [PEM], and 37.9 g of methyl methacrylate (MMA). The container used to weigh the monomers was rinsed with 20 g DI water. A five-liter, 4-neck round bottom flask containing an initial charge of 1170.3 g DI water and 42.9 g of 25 weight percent active ingredient ammonium PEG 300 tridecyl ether phosphate surfactant was heated to 90° C. under nitrogen sweep. An aliquot of ME (86.1 g) was added to the flask followed by the addition of 2.7 g APS dissolved in 21.8 g DI water and a rinse of 12 g of DI water. After stirring for 15 minutes, the remaining ME and a solution of 2.4 g of APS in 165.2 g of DI water were added linearly and separately to the reaction flask over 67 minutes. The temperature of the batch in the kettle was maintained at 89° C. during the addition. When all additions were completed the batch was held for 15 minutes. A second monomer emulsion (ME) was prepared using 137.5 g of DI water, 6.2 g of 25 weight percent active ingredient ammonium PEG 300 tridecyl ether phosphate surfactant, 376.2 g butyl methacrylate (BMA), 43.6 g styrene (STY), and 13 g of methacrylic acid (MAA). The container used to weigh the monomers was rinsed with 20 g DI water. The second ME and a solution of 0.8 g of APS in 55 g of DI water were added linearly and separately to the reaction flask over 23 minutes. The temperature of the batch in the kettle was maintained at 89° C. during the addition. A catalyst/activator pair was added after the monomer emulsion feed was completed. The polymer was neutralized with aqueous ammonia (29%). A variety of compositions and characterizations of such are shown in the following examples.

EXAMPLE 3

Formulations of Aqueous Copolymer Compositions

This example shows specific aqueous binder copolymer compositions that were prepared according to the procedure described in Example 2. Such compositions were incorporated into the formulation described in Example 1 and then evaluated as described in further examples. Table 3.1 below shows polymer binder compositions of the present invention with the general formula of STY/EHA/AN/MMA/PEM/Co-Acid.

TABLE 3.1

| Polymer Sample | STY | EHA | AN | MMA | PEM | Co-Acid |
|---|---|---|---|---|---|---|
| 1 | 30.15 | 45.4 | 19.5 | 2.77 | 2 | — |
| 2 | 29.82 | 44.92 | 19.5 | 2.77 | 2 | 1 AA |
| 3 | 29.82 | 44.92 | 19.5 | 2.77 | 2 | 1 MAA |
| 4 | 29.82 | 44.92 | 19.5 | 2.77 | 2 | 1 o-AA |
| 5 | 29.82 | 44.76 | 19.5 | 2.42 | — | 3.5 MAA |
| 6 | 29.82 | 44.92 | 19.5 | 2.92 | 2.85 | — |
| 7 | 29.82 | 43.92 | 19.5 | 2.92 | 2.85 | 1 MAA |
| 8 | 29.82 | 44.76 | 19.5 | 2.42 | — | 3.5 MAA |
| 9 | 57.58 | 36.65 | — | 2.92 | 2.85 | — |
| 10 | 57.43 | 36.3 | — | 2.92 | 2.85 | 0.5 o-AA |
| 11 | 57.13 | 36.1 | — | 2.92 | 2.85 | 1 o-AA |
| 12 | 55.19 | 36.1 | — | 2.92 | 2.85 | 2.94 o-AA |
| 13 | 59 | 37 | — | — | — | 4 MAA |
| 14 | 29.82 | 43.82 | 19.5 | 3.09 | 3.78 | — |
| 15 | 29.82 | 42.92 | 19.5 | 3.22 | 4.55 | — |

Other aqueous binder copolymer compositions were prepared with varying general formulas such as:
STY/EHA/MMA/PEM/xlinker (xlinker=ALMA, DVB or BGDMA);
STY/EHA/HEMA/MMA/PEM; STY/EHA/EA/MMA/PEM; STY/EHA/AAEM/MMA/PEM;
STY/EHA/BA/MMA/PEM; STY/BMA/MMA/PEM; STY/BA/MMA/PEM;
EHA/BMA/AN/MMA/PEM/nDDM; STY/EHA/AN/MMA/PEM/AAEM/nDDM; and
STY/EHA/LMA/AN/MMA/PEM or combinations. Some binder compositions are shown in Table 3.2.

TABLE 3.2

| Polymer Sample | STY | EHA | AN | MMA | MAA | PEM | Other |
|---|---|---|---|---|---|---|---|
| 16 | 29.82 | 44.92 | 19.5 | 2.42 | — | 2.85 | — |
| 17 | 29.82 | 44.92 | 19.5 | 2.92 | — | 2.85 | 0.15 nDDM |
| 18 | 24.82 | 39.9 | 19.5 | 2.92 | — | 2.85 | 10 AAEM |
| 19 | 24.82 | 39.9 | 19.5 | 2.92 | — | 2.85 | 10 AAEM 0.3 nDDM |
| 20 | 56.25 | 35.98 | — | 2.92 | — | 2.85 | 2 AAEM |
| 21 | 55.34 | 35.89 | — | 2.92 | — | 2.85 | 3 AAEM |
| 22 | 29.82 | 44.66 | 19.5 | 2.42 | 3.51 | — | 0.1 ALMA |
| 23 | 29.82 | 44.66 | 19.5 | 2.42 | 3.51 | — | 0.1 BGDMA |
| 24 | 29.82 | 44.82 | 19.5 | 2.92 | — | 2.85 | 0.1 ALMA |
| 25 | 29.82 | 44.82 | 19.5 | 2.92 | — | 2.85 | 0.1 BGDMA |
| 26 | 10.08 | — | — | 0.5 | — | 2.85 | 86.57 BMA |
| 27 | 54.22 | — | — | 0.5 | — | 2.85 | 42.43 BA |
| 28 | 55.08 | 36.65 | — | 2.92 | — | 2.85 | 2.5 HEMA |
| 29 | 1.55 | 18.2 | 19.3 | 0.5 | — | 2.85 | 57.41 BMA 0.3 nDDM |
| 30 | 57.58 | 36.55 | — | 0.5 | — | 2.85 | 0.1 DVB |
| 31 | 33.65 | 42.25 | 19.5 | 1.9 | — | 2.7 | — |
| 32 | 57.58 | 36.5 | — | 2.92 | — | 2.85 | 0.15 MATS |
| 33 | | | | | | | |
| 75% Stage 1 | 29.82 | 44.92 | 19.5 | 2.92 | — | 2.85 | — |
| 25% Stage 2 | 10.1 | — | — | — | 3.0 | — | 86.92 BMA |
| 34 | 28.26 | 36.65 | — | 32.24 | — | 2.85 | — |
| 35 | 40 | 22.2 | — | 34.9 | — | 2.85 | — |

EXAMPLE 4

Corrosion Resistance, Salt Spray Test

This example examines the corrosion resistance properties of the samples of Examples 1–3. Corrosion resistance was tested by exposure of panels to a salt spray environment (5% sodium chloride fog) in accordance with ASTM B-117-97 test method. Panels were prepared by drawing down the paints on 10 cm×30 cm (4"×12") sandblasted hot-rolled steel panels and drying for two weeks at 24° C. (75° F.)/50% relative humidity to yield a final dry film thickness of $5 \times 10^{-3}$ cm (2 mil). Exposed metal was covered with tape (3M plastic tape #471) prior to exposure. A scribe mark may be scratched into the bottom half of the panel immediately before exposure. Panels are removed periodically to rate rust and blistering. Blister ratings are conducted in accordance with ASTM D714-87 (re-approved 1994) and comprise a number and one or more letters. The number refers to the size of the blister, whereby 1 is the largest size. The letter is a qualitative representation of the density, whereby "f" refers to few, "d" refers to dense, "vf" refers to very few, "m" refers to medium, etc. Rust ratings are shown as a percentage of rust on a panel. Therefore, a result of 95/8d means that there was a dense amount of small blisters with 95% of the panel covered by rust. The results of the spray test on the samples from Example 3 are shown in Table 4.1 below. The numbers are presented as rust/blister ratings. Samples exhibiting poor results after a short period of exposure time were removed from the chamber and not tested for further periods of time. For some samples, the numbers in parenthesis indicate the total quantity of blisters observed.

TABLE 4.1

| Sample | Days | No Scribe | Days | No Scribe | Days | No Scribe |
|---|---|---|---|---|---|---|
| 1 | 7 | 3/9f | 15 | 4/9f | 23 | 7/9f |
| 2 | 7 | 18/9m | 15 | 50/7–9d | 23 | — |
| 3 | 7 | 6/7f | 15 | 15/9f | 23 | 18/6–9f |
| 4 | 7 | 4/7f | 15 | 5/9f | 23 | 8/9f |
| 5 | 7 | 25/6–9m | 15 | — | 23 | — |
| 6 | 2 | 1/7vf | 14 | 2/vf | 22 | 15/4f |
| 7 | 2 | 1/8vf | 14 | — | 22 | — |
| 8 | 2 | 3/7f | 14 | 100/7–9d | 22 | — |
| 9 | 5 | 1/6vf | 13 | 1/4f | 21 | 5/2vf |
| 10 | 5 | 1/4vf | 13 | 1/2f | 21 | 1/2f |

TABLE 4.1-continued

| Sample | Days | No Scribe | Days | No Scribe | Days | No Scribe |
|---|---|---|---|---|---|---|
| 11 | 5 | 5/4vf | 13 | 10/2f | 21 | 15/2f,4d,6d |
| 12 | 5 | 1/4vvf | 13 | 10/4f | 21 | 10/4d,6d |
| 13 | 7 | 7/9f | 14 | 15/9f | 24 | 20/9m |
| 14 | 2 | 20/8–9d | 14 | 100/8–9d | 22 | — |
| 15 | 2 | 40/8–9d | 14 | 100/8–9d | 22 | — |
| 16 | 2 | 4/9f | 8 | 7/7f | 24 | 15/5–9f |
| 17 | 2 | 4/9f | 8 | 8/9f | 24 | 18/9f |
| 18 | 2 | 3/9vf | 8 | 7/9f | 24 | 12/4vf,9m |
| 19 | 2 | 10/9f | 8 | 15/8–9f | 24 | 30/6–9m |
| 20 | 7 | 2/6f,9f | 14 | 5/5–6f | 22 | 6/5–6f |
| 21 | 7 | 2/9vf | 14 | 3/6vf,9f | 22 | 5/6vf,9f |
| 22 | 7 | 25/7–9d | 14 | 40/6d | 21 | — |
| 23 | 7 | 5/8m | 14 | 50/7–9d | 21 | — |
| 24 | 7 | 1/6vf | 14 | 2/6–9f | 21 | 5/6–9f |
| 25 | 7 | 1/8vf | 14 | 1/6vf | 21 | 2/6vf |
| 26 | 7 | 6/8f | 14 | 8/6f,9f | 24 | 18/5f,9f |
| 27 | 7 | 6/7f | 14 | 15/6–9f | 24 | 15/5–9m |
| 28 | 8 | 12/9f | 15 | 35/5–9m | 23 | 45/4–9d |
| 29 | 5 | 5/6vvf(1) | 12 | 5/6–8vvf(3) | 22 | 15/3–5f |
| 30 | 7 | 1/8vf | 14 | 2/6f | 21 | 2/6f–m |
| 31 | 7 | 5/4vf | 14 | 10/3vf | 21 | 5/3vf |
| 32 | 5 | 1/9vvf | 13 | 5/2(3) | 21 | 5/2(3),4vvf |
| 33 | 5 | 1/6vf | 12 | 1/6f | 28 | 1/4f |
| 34 | 8 | 8/7–9f | 15 | 18/9f | 23 | 18/7–9m |
| 35 | 7 | 20/5vf | — | — | 22 | 25/1–6f |

EXAMPLE 5

Gloss

This example examines gloss properties of the samples in Examples 1–3. Gloss was determined by ASTM D-523-89 (re-approved 1999) test method. Aqueous coating compositions were applied to treated cold rolled steel panels at a wet film thickness of 10 mils, in accordance with ASTM D-823-95 procedure E, to give a dry film thickness of about 2 mils. The steel panels were B1000 panels from ACT Labs, 273 Industrial Dr., Hillside, Miss. 49242-0735. Table 5.1 below shows the results of gloss tests for the samples prepared in Example 3. Initial gloss was measured after about two weeks.

TABLE 5.1

| Sample | Gloss (20 deg/60 deg) |
|---|---|
| 1 | 46/77 |
| 2 | 42/77 |
| 3 | 51/80 |
| 4 | 56/82 |
| 5 | 25/66 |
| 6 | 58/83 |
| 7 | 34/73 |
| 8 | 15/58 |
| 9 | 57/88 |
| 10 | 48/86 |
| 11 | 41/83 |
| 12 | 45/85 |
| 13 | 22/69 |
| 14 | 33/72 |
| 15 | 22/64 |
| 16 | 52/80 |
| 17 | 55/82 |
| 18 | 49/79 |
| 19 | 43/76 |
| 20 | 69/91 |
| 21 | 69/91 |
| 22 | 20/61 |
| 23 | 21/62 |
| 24 | 57/79 |
| 25 | 56/79 |
| 26 | 45/75 |
| 27 | 62/86 |
| 28 | 71/91 |
| 29 | 50/78 |
| 30 | 43/80 |
| 31 | 58/83 |
| 32 | 46/83 |
| 33 | 56/82 |
| 34 | 65/87 |
| 35 | 66/86 |

Data Results

The following discussion relates to corrosion resistance and gloss of a corrosion susceptible substrate. Quite unexpectedly the data showed that gloss levels at or above 73 as measured at 60 degrees according to ASTM D-523-89 and either no greater than 20% rust or a blister rating no greater than "M" after at least 7 days of exposure to salt spray according to ASTM B-117-97 were obtained by certain strong acid and co-acid ratios in the binder composition. In obtaining such results, the total acid level of the copolymer binder composition should be less than about six percent (6%) by weight whereby the strong acid monomer is greater than about 45% of the total acid but not exceeding about 3.7% by weight of the copolymer binder composition. Preferably, the total acid level of the copolymer binder composition should be less than about six percent (6%) by weight whereby the strong acid monomer is greater than about 65% of the total acid but not exceeding about 3.7% by weight of the copolymer binder composition. Unexpectedly an upper limit of the strong acid monomer was observed at 3.7% by weight of the copolymer binder composition. The data also indicates that the combination of other monomers and oligomers with strong acid monomer will yield surprising gloss and corrosion resistance at certain prescribed ratios.

What is claimed is:

1. An aqueous coating composition comprising an aqueous emulsion copolymer, said copolymer comprising as polymerized units:

29–34% styrene, 42–45% 2-ethylhexyl acrylate, 19–20% acrylonitrile, 1–3% methyl methacrylate, 2.5–3% phosphoethyl methacrylate and 0–0.2% allyl methacrylate;

wherein the aqueous coating composition exhibits either no greater than 20% rust or a blister rating no greater than "M" after at least 7 days of exposure to salt spray according to ASTM B-117-97 when coated onto a corrosion susceptible substrate.

2. An aqueous coating composition comprising an aqueous emulsion copolymer, said copolymer comprising as polymerized units:

55–58% styrene, 35–37% 2-ethylhexyl acrylate, 2.5–3% methyl methacrylate, 2.5–3% phosphoethyl methacrylate, 0–3.5% 2-(acetoacetoxy)ethyl methacrylate and 0–0.25% methacryloxypropyltrimethoxysilane;

wherein the aqueous coating composition exhibits either no greater than 20% rust or a blister rating no greater than "M" after at least 7 days of exposure to salt spray according to ASTM B-117-97 when coated onto a corrosion susceptible substrate.

3. An aqueous coating composition comprising an aqueous emulsion copolymer, said copolymer comprising as polymerized units:

10–11% styrene, 0–1% methy methacrylate, 2.5–3% phosphoethyl methacrylate and 86–87% butyl methacrylate;

wherein the aqueous coating composition exhibits either no greater than 20% rust or blister rating no greater than "M" after at least 7 days of exposure to salt spray according to ASTM B-117-97 when coated onto a corrsion susceptible substrate.

4. An aqueous coating composition comprising an aqueous emulsion copolymer, said copolymer comprising as polymerized units:

54–55% styrene, 0–1% methyl methacrylate, 2.5–3% phosphoethyl methacrylate and 42–43% butyl acrylate;

wherein the aqueous coating composition exhibits either no greater than 20% rust or a blister rating no greater than "M" after at least 7 days of exposure to salt spray according to ASTM B-117-97 when coated onto a corrosion susceptible substrate.

5. An aqueous coating composition comprising an aqueous emulsion copolymer, said copolymer comprising as polymerized units:

28–29% styrene. 36–37% ethylhexyl acrylate, 31–32% methyl methacrylate, and 2.5–3% phosphoethyl methacrylate;

wherein the aqueous coating composition exhibits either no greater than 20% rust or a blister rating no greater than "M" after at least 7 days of exposure to salt spray according to ASTM B-117-97 when coated onto a corrosion susceptible substrate.

* * * * *